US010731542B2

(12) United States Patent
Hara et al.

(10) Patent No.: US 10,731,542 B2
(45) Date of Patent: Aug. 4, 2020

(54) INTERNAL COMBUSTION ENGINE COOLING SYSTEM

(71) Applicant: HONDA MOTOR CO., LTD., Tokyo (JP)

(72) Inventors: Takeshi Hara, Wako (JP); Hisashi Daicho, Wako (JP); Nobuo Suzuki, Wako (JP); Kazuhiko Imamura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/085,211

(22) PCT Filed: Mar. 16, 2017

(86) PCT No.: PCT/JP2017/010566
§ 371 (c)(1),
(2) Date: Sep. 14, 2018

(87) PCT Pub. No.: WO2017/159766
PCT Pub. Date: Sep. 21, 2017

(65) Prior Publication Data

US 2019/0085753 A1 Mar. 21, 2019

(30) Foreign Application Priority Data

Mar. 16, 2016 (JP) ................................ 2016-052425

(51) Int. Cl.
*F01P 7/16* (2006.01)
*F02D 45/00* (2006.01)
(Continued)

(52) U.S. Cl.
CPC .................. *F01P 7/16* (2013.01); *F01P 3/20* (2013.01); *F01P 7/167* (2013.01); *F02D 45/00* (2013.01);
(Continued)

(58) Field of Classification Search
CPC ...... F01P 7/16; F01P 7/167; F01P 3/20; F01P 2070/04; F01P 2003/027; F01P 2025/32;
(Continued)

(56) References Cited

U.S. PATENT DOCUMENTS 6,223,700 B1 5/2001 Sano et al.
9,115,634 B2* 8/2015 Triebe .................... F01P 7/161
(Continued)

FOREIGN PATENT DOCUMENTS

JP H11-287123 A 10/1999
JP 2003-262125 A 9/2003
(Continued)

OTHER PUBLICATIONS

International Search Report by ISA/JP dated Jun. 6, 2017, on PCT/JP2017/010566 (4 pages).
(Continued)

*Primary Examiner* — Joseph J Dallo
*Assistant Examiner* — Kurt Philip Liethen
(74) *Attorney, Agent, or Firm* — Rankin, Hill & Clark LLP

(57) ABSTRACT

An internal combustion engine cooling system, including: an internal combustion engine; a cooling circuit in which cooling fluid for cooling the internal combustion engine is circulated; a radiator for cooling the cooling fluid; a radiator circuit that branches from the cooling circuit to guide the cooling fluid to the radiator and return the cooling fluid having passed the radiator to the cooling circuit; a thermostat that is provided in a portion where the cooling circuit and the radiator circuit are connected to each other and that opens and closes a path between cooling circuit and the radiator circuit; a heater for heating the thermostat; and a control device for controlling the heater.

3 Claims, 9 Drawing Sheets

(51) Int. Cl.
*F01P 3/20* (2006.01)
*F01P 3/02* (2006.01)
*F01P 7/14* (2006.01)

(52) U.S. Cl.
CPC ... *F01P 2003/027* (2013.01); *F01P 2007/146* (2013.01); *F01P 2025/32* (2013.01); *F01P 2060/08* (2013.01); *F01P 2070/04* (2013.01); *F02D 2200/021* (2013.01)

(58) Field of Classification Search
CPC . F01P 2060/08; F01P 2007/146; F02D 45/00; F02D 2200/021
See application file for complete search history.

(56) References Cited

U.S. PATENT DOCUMENTS

| | | | | |
|---|---|---|---|---|
| 9,574,486 | B2 * | 2/2017 | Lee | F01P 7/167 |
| 2012/0111956 | A1 * | 5/2012 | Kinomura | F01P 7/167 236/93 R |
| 2013/0263802 | A1 * | 10/2013 | Lee | F01P 7/167 123/41.08 |
| 2016/0160738 | A1 * | 6/2016 | Na | F02M 31/042 123/41.08 |
| 2018/0347448 | A1 * | 12/2018 | Morota | F16K 11/0856 |

FOREIGN PATENT DOCUMENTS

| | | | |
|---|---|---|---|
| JP | 2006-037883 | A | 2/2006 |
| JP | 2006-329145 | A | 12/2006 |
| JP | 2009-097352 | A | 5/2009 |
| JP | 2013-019297 | A | 1/2013 |
| JP | 5152595 | B2 | 2/2013 |

OTHER PUBLICATIONS

Written Opinion by ISA/JP dated Jun. 6, 2017, on PCT/JP2017/010566 (5 pages).
Japanese Office Action with English translation dated May 28, 2019, 12 pages.

* cited by examiner

FIG. 3A TARGET WATER TEMPERATURE MAP 51a
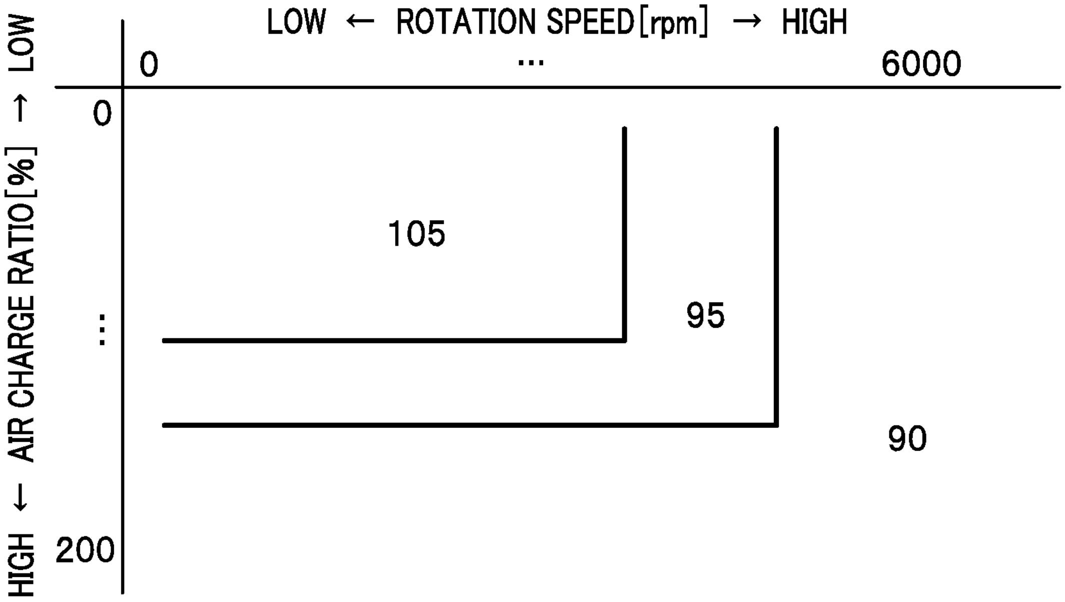
FIG. 3B MAIN POWER SUPPLYING DUTY RATIO MAP 51b
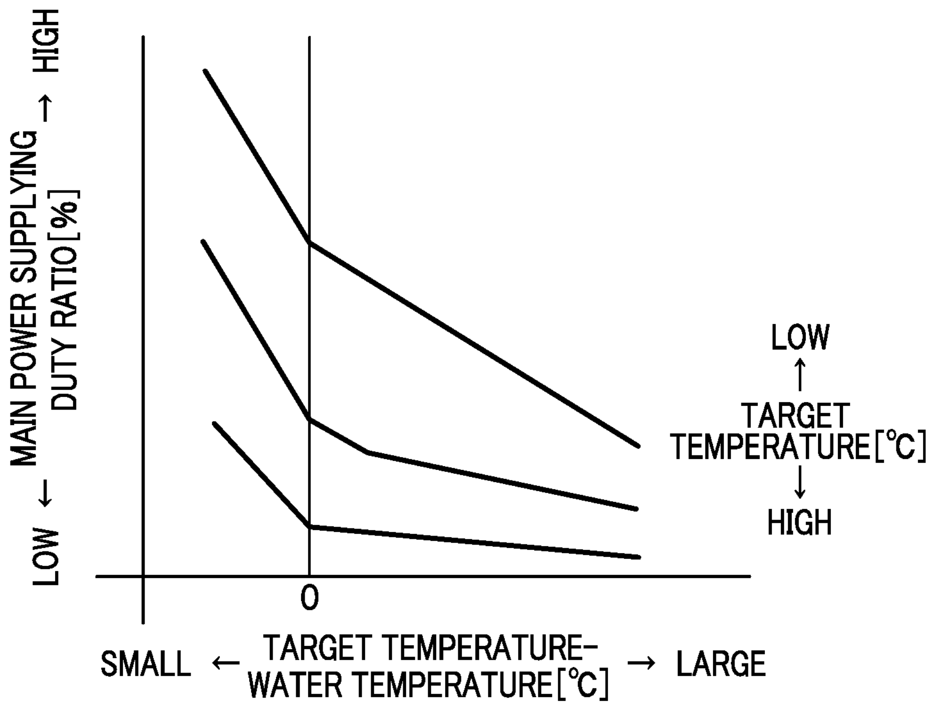

FIG. 4A PRE-POWER SUPPLYING DUTY RATIO MAP 51c
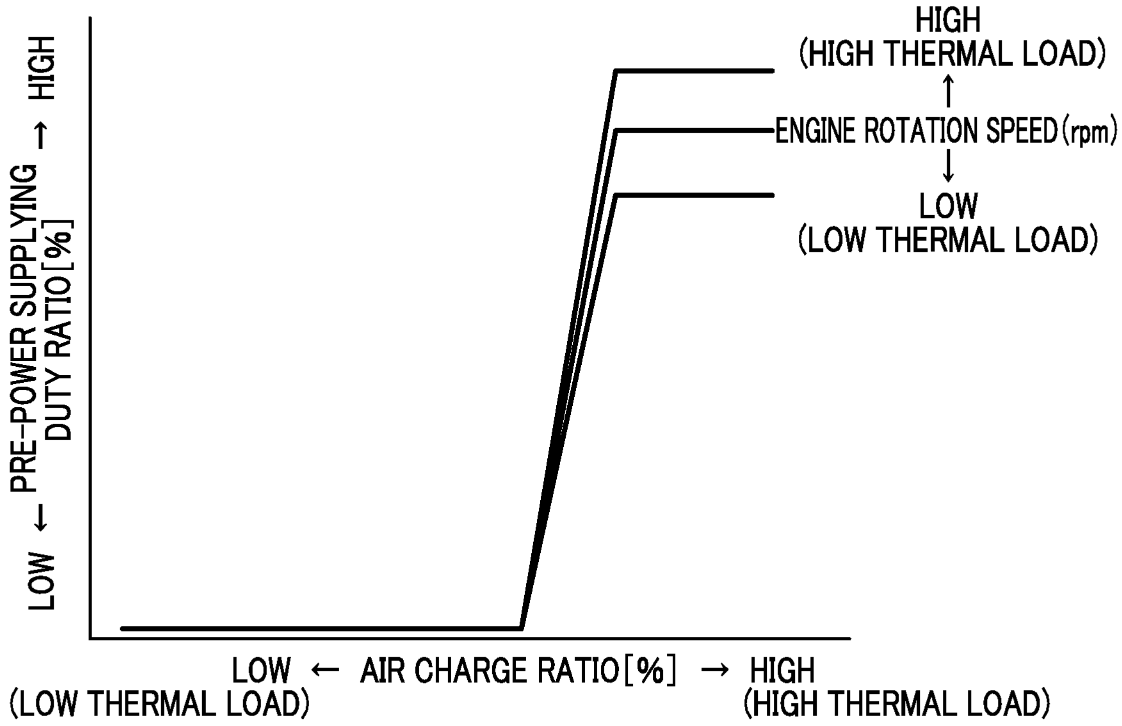
FIG. 4B STANDBY POWER SUPPLYING DUTY RATIO MAP 51d
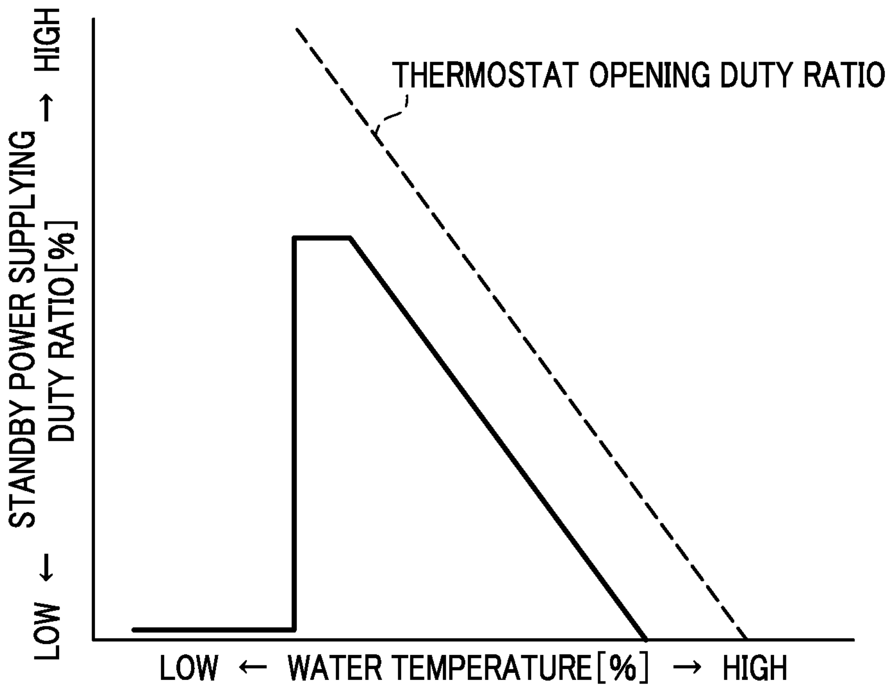

FIG. 7A <LOW THERMAL LOAD>
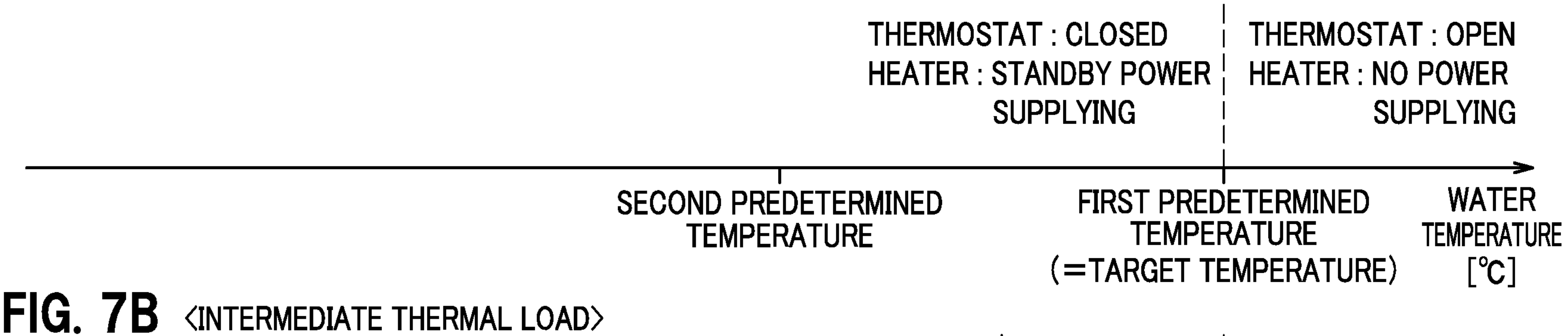
FIG. 7B <INTERMEDIATE THERMAL LOAD>
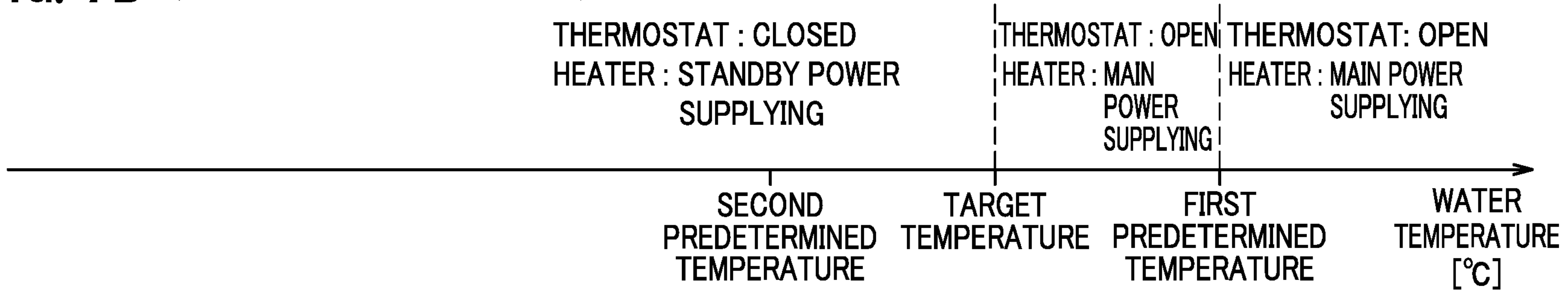
FIG. 7C <HIGH THERMAL LOAD>
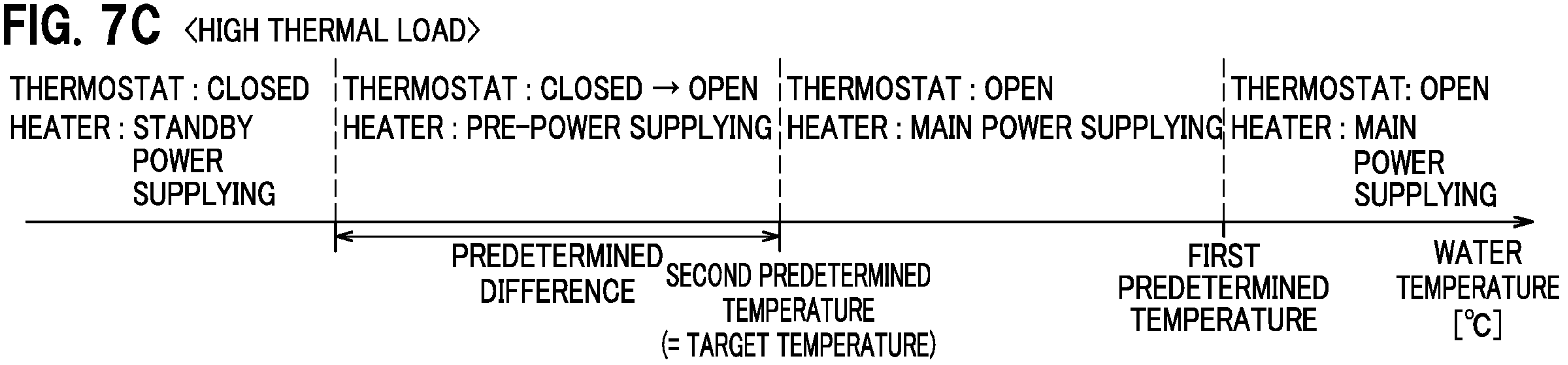

INTERNAL COMBUSTION ENGINE COOLING SYSTEM

TECHNICAL FIELD

The present invention relates to a system for cooling an internal combustion engine.

BACKGROUND ART

In a system for cooling the internal combustion engine provided in a vehicle, an electronically-controlled thermostat including a heater is used as a valve for switching a flow path of cooling water (see Patent Literature 1).

The thermostat is a wax thermostat which opens and closes by utilizing a volume change of wax which occurs with a temperature change. Such a thermostat opens not only when the temperature of the cooling water rises but also when the thermostat is heated by the heater.

In the technique described in Patent Literature 1, the heater is supplied with heater supply power set for each target cooling water temperature and causes the thermostat to open at the target cooling water temperature (see FIGS. 2 and 3 and others in Patent Literature 1).

CITATION LIST

Patent Literature

Patent Literature 1: JP 5152595 B

SUMMARY OF INVENTION

Technical Problem

Patent Literature 1 describes correcting the power to be supplied to the heater after completion of warm-up of the engine depending on a condition such as a deviation between the cooling water temperature and the target cooling water temperature (see FIG. 9 and others in Patent Literature 1) but does not describe timing to start the power supplying to the heater.

In the electronically-controlled wax thermostat, even when the water temperature of the cooling water rises or the heater heats the thermostat, opening response of the thermostat is sometimes delayed by a time required for the volume of wax to change.

For example, when the engine abruptly transitions from a low thermal load range to a high thermal load range during warm-up, the water temperature of the cooling water abruptly rises before the opening of the thermostat, which may impair the performance of cooling engine parts and therefore affect the durability life of the engine.

The present invention has been made in view of the aforementioned points and has an object to provide an internal combustion engine cooling system which can preferably heat a thermostat with a heater.

Solution to Problem

In order to solve the aforementioned problems, an internal combustion engine cooling system of the present invention includes: an internal combustion engine; a cooling circuit in which cooling fluid for cooling the internal combustion engine is circulated; a radiator for cooling the cooling fluid; a radiator circuit which branches from the cooling circuit to guide the cooling fluid to the radiator and return the cooling fluid having passed the radiator to the cooling circuit; a thermostat which is provided in a portion where the cooling circuit and the radiator circuit are connected to each other and which opens and closes a path between cooling circuit and the radiator circuit; a heater for heating the thermostat; and a control device for controlling the heater, wherein the thermostat is in a closed state for blocking the path between the cooling circuit and the radiator circuit below a first predetermined temperature and is in an open state for opening the path between the cooling circuit and the radiator circuit at or above the first predetermined temperature, and the control device starts supplying power to the heater to set the thermostat to the open state, based on rotation speed of the internal combustion engine, engine load of the internal combustion engine, and temperature of the cooling fluid flowing through the thermostat.

In this configuration, the timing of starting the power supplying to the thermostat is determined based on the rotation speed and engine load (air charge ratio) of the internal combustion engine and the water temperature of the cooling fluid flowing through the thermostat. Accordingly, it is possible to preferably heat the thermostat with the heater and prevent abnormal temperature rise of the cooling fluid.

The internal combustion engine cooling system may be configured such that the control device includes a target temperature map in which the rotation speed and the engine load of the internal combustion engine are associated with a target temperature of the cooling fluid flowing through the thermostat, and starts supplying power to the heater to set the thermostat to the open state when the target temperature associated with the rotation speed and the engine load is equal to or lower than a second predetermined temperature lower than the first predetermined temperature and a difference between the target temperature and the temperature of the cooling fluid is larger than a predetermined value.

In this configuration, when the internal combustion engine is in a high thermal load state, it is possible to preferably heat the thermostat with the heater and prevent the abnormal water temperature rise of the cooling water.

The internal combustion engine cooling system may be configured such that the control device performs duty control on the heater such that the larger the difference between the target temperature and the temperature of the cooling fluid is, the higher a duty ratio in the power supplying is.

In this configuration, for example, when the temperature of the cooling fluid exceeds the target temperature, it is possible to increase the duty ratio of the heater and increase the flow rate of the cooling fluid to the radiator.

The internal combustion engine cooling system may be configured such that, when the target temperature of the cooling fluid is higher than the second predetermined temperature and is lower than the first predetermined temperature and the temperature of the cooling fluid is lower than the target temperature or when the target temperature of the cooling fluid is the second predetermined temperature or lower and the difference between the target temperature and the temperature of the cooling fluid is equal to or smaller than the predetermined value, the control device performs standby power supplying to the heater within a range in which the thermostat is maintained in the closed state.

In this configuration, prior to the power supplying (pre-power supplying and main power supplying) to the heater, the standby power supplying to the heater is performed within the range in which the thermostat is maintained in the closed state. Accordingly it is possible to preheat the thermostat and improve opening response.

Furthermore, combining the pre-power supplying and the standby power supplying can increase the predetermined value (target temperature−detected temperature of cooling fluid) which is a threshold for the pre-power supplying (that is bring the predetermined value closer to zero).

The internal combustion engine cooling system may be configured such that the control device performs duty control on the heater such that the higher the temperature of the cooling fluid is, the lower a duty ratio in the standby power supplying is.

In this configuration, the duty control is performed on the heater such that the higher the temperature of the cooling fluid is, the lower the duty ratio in the standby power supplying is. Accordingly, the heater can be preferably preheated within the range in which the thermostat is maintained in the closed state.

Moreover, an internal combustion engine cooling system of the present invention includes: an internal combustion engine; a cooling circuit in which cooling fluid for cooling the internal combustion engine is circulated; a radiator for cooling the cooling fluid; a radiator circuit which branches from the cooling circuit to guide the cooling fluid to the radiator and return the cooling fluid having passed the radiator to the cooling circuit; a thermostat which is provided in a portion where the cooling circuit and the radiator circuit are connected to each other and which opens and closes a path between cooling circuit and the radiator circuit; a heater for heating the thermostat; and a control device for controlling the heater, wherein the thermostat is in a closed state for blocking the path between the cooling circuit and the radiator circuit below a first predetermined temperature and is in an open state for opening the path between the cooling circuit and the radiator circuit at or above the first predetermined temperature, and when a target temperature of the cooling fluid flowing through the thermostat is higher than a second predetermined temperature which is lower than the first predetermined temperature and is lower than the first predetermined temperature and a temperature of the cooling fluid flowing through the thermostat is lower than the target temperature or when the target temperature of the cooling fluid is at or lower than the second predetermined temperature and a difference between the target temperature and the temperature of the cooling fluid is equal to or smaller than a predetermined value, the control device performs standby power supplying to the heater within a range in which the thermostat is maintained in the closed state.

In this configuration, it is possible to preheat the thermostat and improve opening response of the thermostat.

Advantageous Effects of Invention

According to the present invention, the thermostat can be preferably heated with the heater.

BRIEF DESCRIPTION OF DRAWINGS

FIG. 1A shows a state where a thermostat is in a closed state and no cooling water is flowing to a radiator;

FIG. 1B shows a state where the thermostat is an open state and the cooling water is flowing to the radiator;

FIG. 3A shows an example of a target water temperature map;

FIG. 3B shows an example of a power supplying duty ratio map as a graph;

FIG. 4A shows an example of a pre-power supplying duty ratio map as a graph;

FIG. 4B shows an example of a standby power supplying duty ratio map as a graph;

FIG. 6A is a graph showing an example of a change in the air charge ratio of the engine over time;

FIG. 6B is a graph showing the duty ratio of the heater;

FIG. 6C is a graph showing the water temperature detected by a water temperature sensor;

FIG. 6D is a graph showing the inter-cylinder temperature of the engine;

FIGS. 7A to 7C show relationships of the water temperature detected by the water temperature sensor with an open-closed state of the thermostat and a power supplying state of the heater;

FIG. 7A shows the case of low thermal load;

FIG. 7B shows intermediate thermal load;

FIG. 7C shows high thermal load;

FIG. 8A is a graph showing an example of a change in the air charge ratio of the engine over time;

FIG. 8B is a graph the duty ratio of the heater;

FIG. 8C is a graph showing the water temperature detected by the water temperature sensor;

FIG. 8D is a graph showing the inter-cylinder temperature of the engine.

DESCRIPTION OF EMBODIMENTS

Figure 1A:
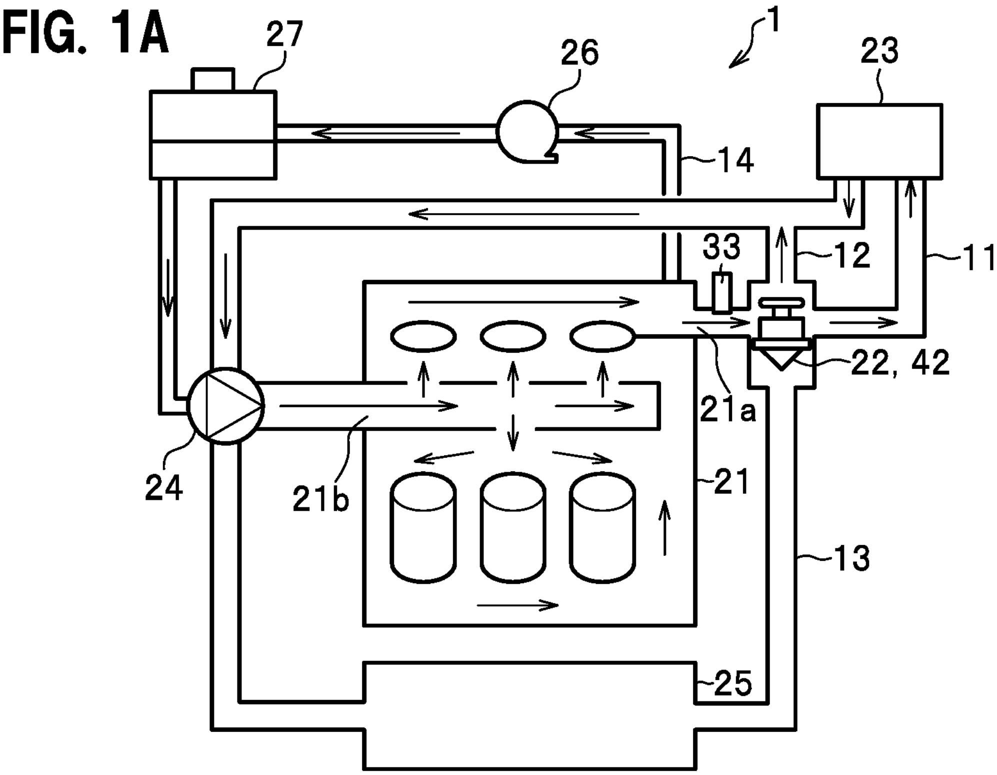
FIGS. 1A and 1B are schematic views showing an internal combustion engine cooling system according to an embodiment of the present invention.
Figure 1B:
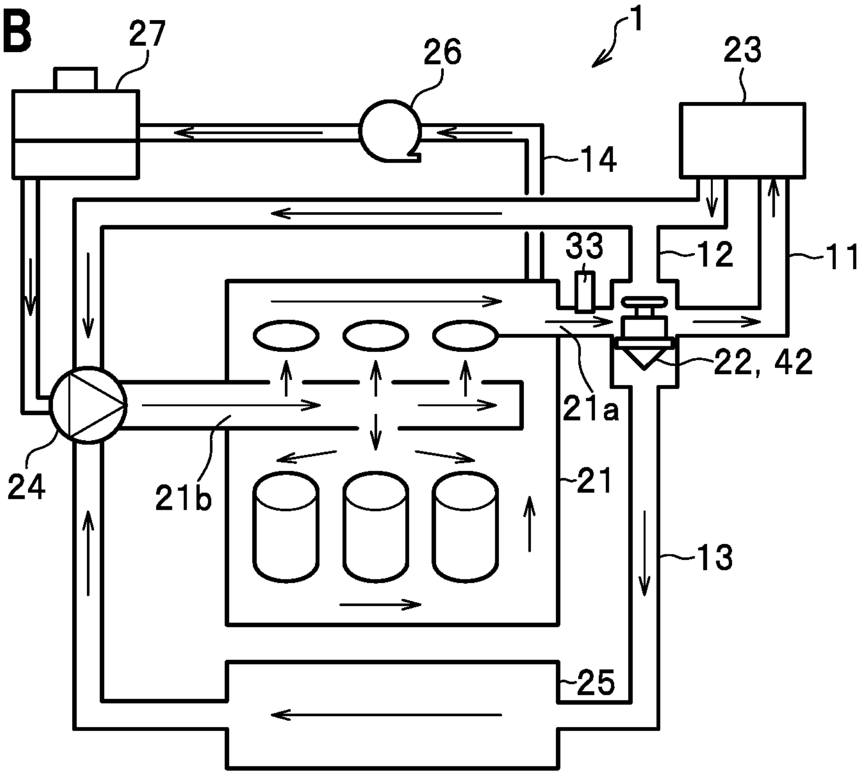

Next, an embodiment of the present invention is described in detail with reference to the drawings as necessary. As shown in FIGS. 1A and 1B, an internal combustion engine cooling system 1 according to the embodiment of the present invention is a system for cooling an engine 21 being an internal combustion engine provided in a vehicle by circulating cooling water being cooling fluid. Arrows in FIGS. 1A and 1B indicate a flow direction of the cooling water.

<Internal Combustion Engine Cooling System>

The internal combustion engine cooling system 1 includes a cooling circuit 11, a bypass circuit 12, a radiator circuit 13, and a turbocharger circuit 14 as circuits through which the cooling water flows.

Moreover, the internal combustion engine cooling system 1 includes the engine 21 which is the internal combustion engine, a thermostat 22 which is an opening-closing valve, a heater core 23, a pump 24, a radiator 25, a turbocharger 26, and a gas-liquid separator 27 on the circuits 11 to 14.

<Circuits>

First, the circuits through which the cooling water flows in the internal combustion engine cooling system 1 are described.

<<Cooling Circuit>>

The cooling circuit 11 is a circuit in which the cooling water for cooling the engine 21 is circulated.

An upstream end portion of the cooling circuit 11 is connected to a cooling water outlet 21*a* of the engine 21 and a downstream end portion of the cooling circuit 11 is connected to a cooling water inlet 21*b* of the engine 21.

The thermostat 22, the heater core 23, and the pump 24 are provided on the cooling circuit 11 in this order from the upstream side (cooling water outlet 21*a* side).

<<Bypass Circuit>>

The bypass circuit 12 is a circuit for causing the cooling water to flow from the thermostat 22 to a downstream of the heater core 23 in a closed state of the thermostat 22 in the cooling circuit 11.

An upstream end portion of the bypass circuit 12 is connected to a portion of the cooling circuit 11 provided with the thermostat 22. A downstream end portion of the bypass circuit 12 is connected to a portion of the cooling circuit 11 downstream of the heater core 23.

<<Radiator Circuit>>

The radiator circuit 13 is a circuit for returning the cooling water in the cooling circuit 11 to the cooling circuit 11 via the radiator 25.

An upstream end portion of the radiator circuit 13 is connected to the portion of the cooling circuit 11 provided with the thermostat 22 and a downstream end portion of the radiator circuit 13 is connected to a portion of the cooling circuit 11 provided with the pump 24.

The radiator 25 is provided on the radiator circuit 13.

<<Turbocharger Circuit>>

The turbocharger circuit 14 is a circuit for returning the cooling water in the cooling circuit 11 to the cooling circuit 11 via the turbocharger 26.

An upstream end portion of the turbocharger circuit 14 is connected to the cooling water outlet 21*a* of the engine 21 and a downstream end portion of the turbocharger circuit 14 is connected to the portion of the cooling circuit 11 provided with the pump 24.

The turbocharger 26 and the gas-liquid separator 27 are provided on the turbocharger circuit 14.

<Devices on Circuits>

Next, devices provided on the circuits 11 to 14 in the internal combustion engine cooling system 1 are described.

<<Engine>>

The engine 21 is a drive source of the vehicle provided with the engine 21 and includes a cylinder block, a cylinder head, pistons, connecting rods, a crank shaft, and the like which are not shown.

<<Thermostat>>

The thermostat 22 is provided in a connection portion between the cooling circuit 11 and the radiator circuit 13 and is a valve which opens and closes a path between the cooling circuit 11 and the radiator circuit 13.

Specifically, the thermostat 22 is a so-called wax thermostat and opens and closes an inlet from the cooling circuit 11 to the radiator circuit 13 by utilizing a volume change of wax which occurs with a temperature change.

In the embodiment, the thermostat 22 is in a closed state below a first predetermined temperature (for example, 105° C.) to block the flow of cooling water from the cooling circuit 11 to the radiator circuit 13 and allow the flow of cooling water from the cooling circuit 11 to the bypass circuit 12. The thermostat 22 is in an open state at and above the first predetermined temperature to allow the flow of cooling water from the cooling circuit 11 to the radiator circuit 13 and block the flow of cooling water from the cooling circuit 11 to the bypass circuit 12.

Moreover, the thermostat 22 is a so-called electronically-controlled thermostat and integrally includes a heater 42 to be described later. The heater 42 generates heat by being controlled by a control device 50 and the thermostat 22 can open and close by being heated by thus-generated heat (see FIG. 2).

<<Heater Core>>

The heater core 23 is provided in the cooling circuit 11 and is a device which exchanges heat between the cooling water heated by heat exchange in the engine 21 and air introduced into the heater core 23 from a vehicle cabin and heats the air by such heat exchange. The air heated by the heater core 23 is returned into the vehicle cabin.

<<Pump>>

The pump 24 is provided at the portion where the cooling circuit 11 is connected to the radiator circuit 13 and the turbocharger circuit 14 and pumps out the cooling water in the cooling circuit 11, the radiator circuit 13, and the turbocharger circuit 14 to generate a flow of cooling water toward the cooling water inlet 21*b* of the engine 21, based on control of a motor 41 performed by the control device 50 to be described later.

<<Radiator>>

The radiator 25 is provided on the radiator circuit 13 and is a device which exchanges heat between the cooling water heated by the heat exchange in the engine 21 and air sent to the radiator 25 by traveling of the vehicle and cools the cooling water by such heat exchange.

<<Turbocharger>>

The turbocharger 26 is provided on the turbocharger circuit 14 and is a device which compresses air and supplies it to the engine 21 based on the control of the control device 50 to be described later. The turbocharger 26 is cooled by the cooling water flowing through the turbocharger circuit 14.

<<Gas-Liquid Separator>>

The gas-liquid separator 27 is provided on the turbocharger circuit 14 and is a device which separates gas included in the cooling water from the cooling water.

<Sensors, Control Device, and the Like>

Figure 2:
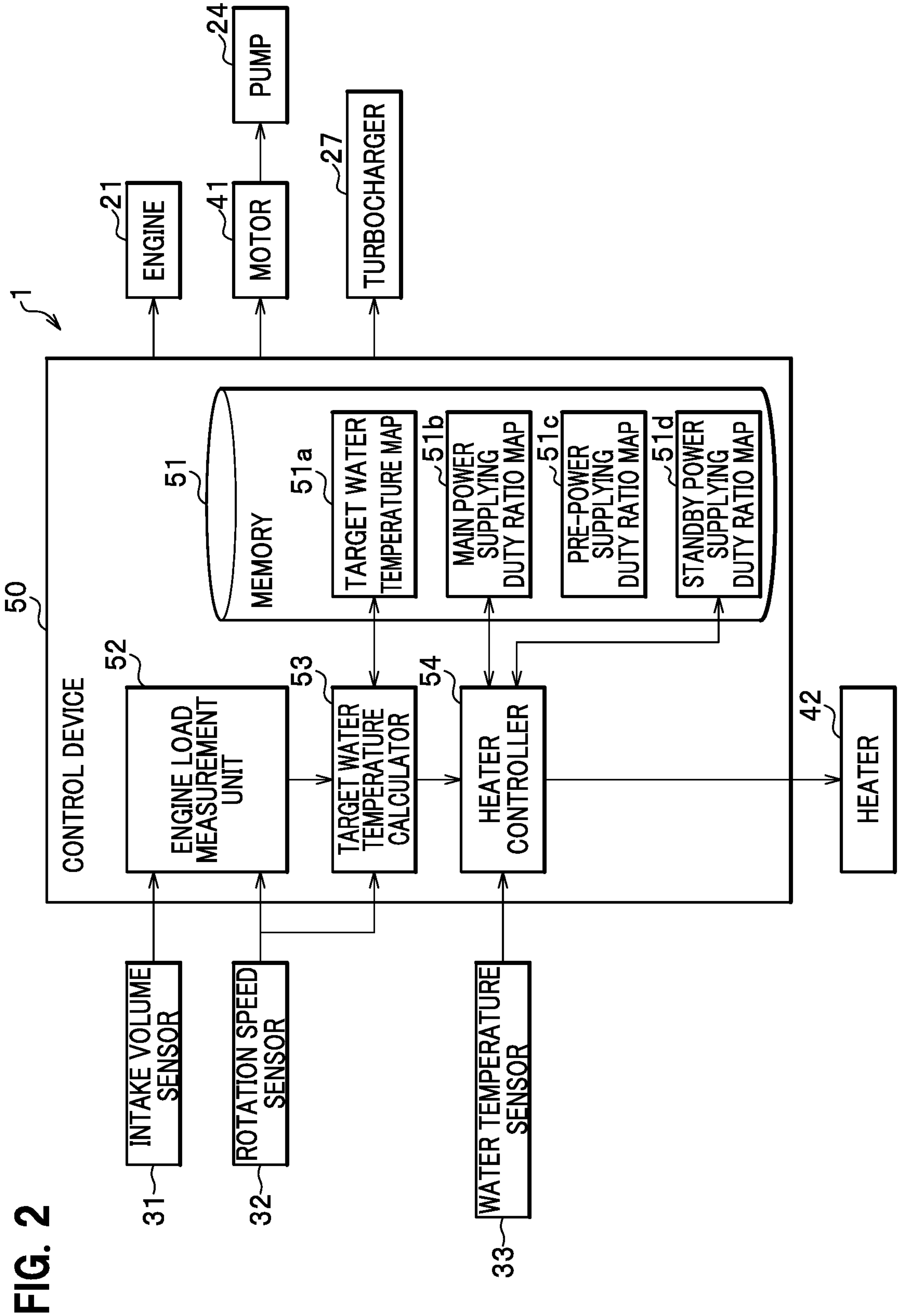
FIG. 2 is a block diagram showing the internal combustion engine cooling system according to the embodiment of the present invention.

As shown in FIG. 2, the internal combustion engine cooling system 1 includes an intake volume sensor 31, a rotation speed sensor 32, a water temperature sensor 33, the motor 41, the heater 42, and the control device 50.

<<Intake Volume Sensor>>

The intake volume sensor 31 is a sensor which detects an intake volume of air to be taken in from intake valves of the engine 21 as a parameter for calculating an intake air volume being an example of an engine load of the engine 21 and which outputs the detected intake volume to the control device 50.

<<Rotation Speed Sensor>>

The rotation speed sensor 32 is a sensor which detects the rotation speed of a crank shaft being an output shaft of the engine 21 as a parameter for calculating the intake air volume being an example of the engine load of the engine 21 and which outputs the detected rotation speed to the control device 50.

<<Water Temperature Sensor>>

The water temperature sensor 33 is a sensor which detects the temperature (water temperature) of the cooling water flowing through the portion of the cooling circuit 11 provided with the thermostat 22 (that is the cooling water heated by the heat exchange in the engine 21) and outputs the detected water temperature to the control device 50.

<<Motor>>

The motor 41 is made to rotate by the control of the control device 50 and activates the pump 24 described above.

<<Heater>>

The heater 42 is provided integrally with the thermostat 22. Electric power is supplied to the heater 42 by the control of the control device 50 and the heater 22 thereby generates heat to heat the thermostat 22.

Duty control can be performed to control the amount of power supplied to the heater 42 by the control device 50.

<<Control Device>>

The control device 50 is an engine ECU (Electrical Control Unit) for controlling the internal combustion engine cooling system 1 including the engine 21 and includes a CPU (Central Processing Unit), a ROM (Read-Only Memory), a RAM (Random Access Memory), an input-output circuit, and the like.

The control device 50 includes a memory 51, an engine load measurement unit 52, a target water temperature calculator 53, and a heater controller 54 as function units for controlling the heater 42.

<<Memory>>

A target water temperature map 51*a*, a main power supplying duty ratio map 51*b*, a pre-power supplying duty ratio map 51*c*, a standby power supplying duty ratio map 51*d* are stored in the memory 51.

<<Target Water Temperature Map>>

As shown in FIG. 3A, the target water temperature map 51*a* is a map in which an air charge ratio [%], the rotation speed [rpm] of the engine 21, and the target water temperature [° C.] of the cooling water are associated with one another.

In the embodiment, the target water temperature in the target water temperature map 51*a* is set such that the higher the air charge ratio of the engine 21 is, the lower the target water temperature is, and the higher the rotation speed of the engine 21 is, the lower the target water temperature is.

<<Main Power Supplying Duty Ratio Map>>

As shown in FIG. 3B, the main power supplying duty ratio map 51*b* is a map used to perform main power supplying and the target water temperature [° C.] of the cooling water, a difference [° C.] between the target water temperature of the cooling water and the water temperature detected by the water temperature sensor 33, and a duty ratio of the heater 42 in the main power supplying (main heating of the thermostat 22) are associated with one another.

<<Pre-Power Supplying Duty Ratio Map>>

As shown in FIG. 4A, the pre-power supplying duty ratio map 51*c* is a map used to perform pre-power supplying in a warm-up process at a high thermal load and the engine rotation speed [rpm], the air charge ratio [%] of the engine 21, and a duty ratio of the heater 42 in the pre-power supplying (preheating of the thermostat 22) are associated with one another.

In the embodiment, in the pre-power supplying duty ratio map 51*c*, a power supplying duty ratio is set to be higher than zero under a high thermal load condition, based on the engine rotation speed and the air charge ratio of the engine 21.

Moreover, the pre-power supplying duty ratio map 51*c* is set to be used when the difference between the target water temperature of the cooling water and the water temperature detected by the water temperature sensor 33 is larger than a predetermined value (for example, −5° C.).

<<Standby Power Supplying Duty Ratio Map>>

As shown in FIG. 4B, the standby power supplying duty ratio map 51*d* is a map in which the water temperature [° C.] detected by the water temperature sensor 33 and the duty ratio of the heater 42 in standby power supplying are associated with each other.

In the embodiment, the duty ratio in the standby power supplying duty ratio map 51*d* is set within a range in which the thermostat 22 is maintained in the closed state, that is a range below the duty ratio at which the thermostat 22 opens (lower than the thermostat 22 opening duty ratio in FIG. 4B).

Moreover, the duty ratio in the standby power supplying duty ratio map 51*d* is set such that, in a range equal to or above certain water temperature, the higher the water temperature detected by the water temperature sensor 33 is, the lower the duty ratio is.

<<Engine Load Measurement Unit>>

The engine load measurement unit 52 obtains an engine load calculation parameter outputted from an engine load calculation parameter detector and measures (calculates) the engine load of the engine 21 based on the obtained engine load calculation parameter.

In the embodiment, the engine load measurement unit 52 obtains the intake volume of the engine 21 detected by the intake volume sensor 31 and the rotation speed of the engine 21 detected by the rotation speed sensor 32, measures (calculates) the air charge ratio as the engine load based on the obtained intake volume and rotation speed, and outputs the measured air charge ratio to the target water temperature calculator 53.

The air charge ratio is a ratio of the volume of air taken in by the engine 21.

Note that the engine load measurement unit 52 can also measure the air charge ratio based on an operating condition of the turbocharger 26 in addition to the intake volume and the rotation speed.

<<Target Water Temperature Calculator>>

The target water temperature calculator 53 obtains the engine load (air charge ratio) measured by the engine load measurement unit 52 and the rotation speed of the engine 21 detected by the rotation speed sensor 32 and calculates the target water temperature of the cooling water based on the obtained engine load and rotation speed.

In the embodiment, the target water temperature calculator 53 calculates the target water temperature by referring to the target water temperature map 51*a* based on the obtained air charge ratio and rotation speed to read the target water temperature corresponding to the obtained air charge ratio and rotation speed, and outputs the calculated target water temperature to the heater controller 54.

<<Heater Controller>>

The heater controller 54 obtains the target water temperature calculated by the target water temperature calculator 53 and the water temperature (actual water temperature) of the cooling water detected by the water temperature sensor 33 and controls the heater 42 based on the obtained target water temperature and water temperature.

In the embodiment, the heater controller 54 executes control of performing the pre-power supplying and the main power supplying to the heater 42 (preheating and main heating of the thermostat 22) to cause the thermostat 22 to open in a warm-up process performed when the engine 21 is in a high thermal load state, executes control of performing the main power supplying to the heater 42 (main heating of the thermostat 22) to cause the thermostat 22 to open in a warm-up process performed when the engine 21 is in an intermediate thermal load state, and executes control of performing the standby power supplying to the heater 42 (standby heating of the thermostat 22) in a warm-up process performed when the engine 21 is in an intermediate or low thermal load state. Methods of the control are described in detail in operation examples to be described later.

<Relationships Among Target Water Temperature, Predetermined Temperature, and Predetermined Value>

The target water temperature is temperature at which the thermostat 22 is to be opened. When the target water temperature is lower than the first predetermined temperature, the heater controller 54 performs the main power supplying to the heater 42 in the case where the water temperature detected by the water temperature sensor 33 is the target water temperature or higher.

The first predetermined temperature is a temperature at which the thermostat 22 opens, and is set as the highest value of the target water temperature in the target water temperature map 51*a*.

A second predetermined temperature is set to be the lowest value of the target water temperature in the target water temperature map 51*a* or higher and lower than the highest value of the target water temperature in the target water temperature map 51*a* (set to be the lowest value in the embodiment).

A predetermined value relating to the difference between the target water temperature and the water temperature is set such that the heater controller 54 performs the pre-power supplying to the heater 42 when the temperature difference between the water temperature detected by the water temperature sensor 33 and the target water temperature is larger than the predetermined value. Specifically, the thermostat 22 is set such that performing the pre-power supplying causes the thermostat 22 to open when the water temperature reaches the target water temperature.

<First Operation Example>

Next, a first operation example of the internal combustion engine cooling system 1 is described. In an example of regions indicating the warm-up process and a period after the warm-up shown in FIG. 5B, the target temperature at the low thermal load is set to be equal to the first predetermined temperature and the target temperature at the high thermal load is set be equal to the second predetermined temperature.

Figure 5A:
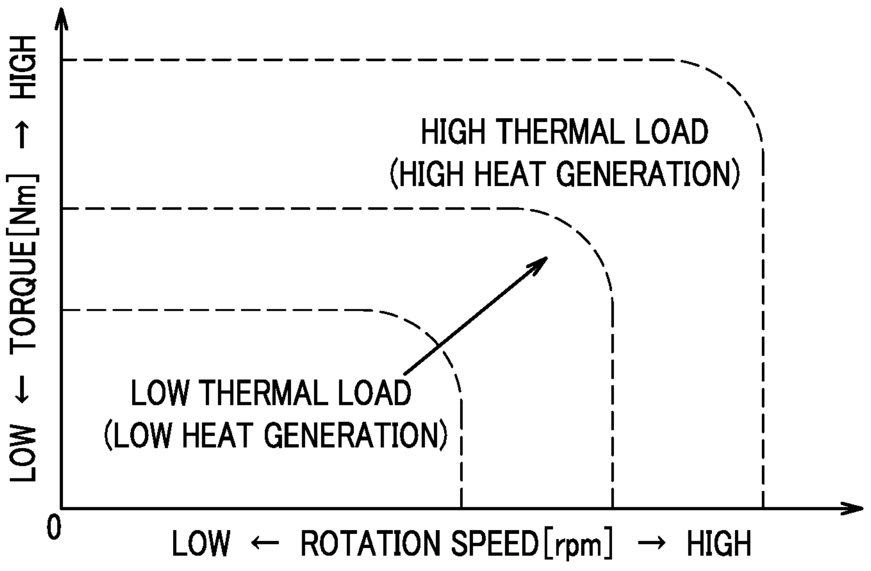
FIG. 5A shows relationships of the thermal load of the engine with the rotation speed and torque of the engine.

As shown in FIG. 5A, when the rotation speed of the engine 21 and the torque of the engine 21 are both low, the thermal load of the engine 21 is low. When either the rotation speed of the engine 21 or the torque of the engine 21 is high, the thermal load of the engine 21 is high.

<<Warm-Up Process at Low Thermal Load>>

Figure 5B:
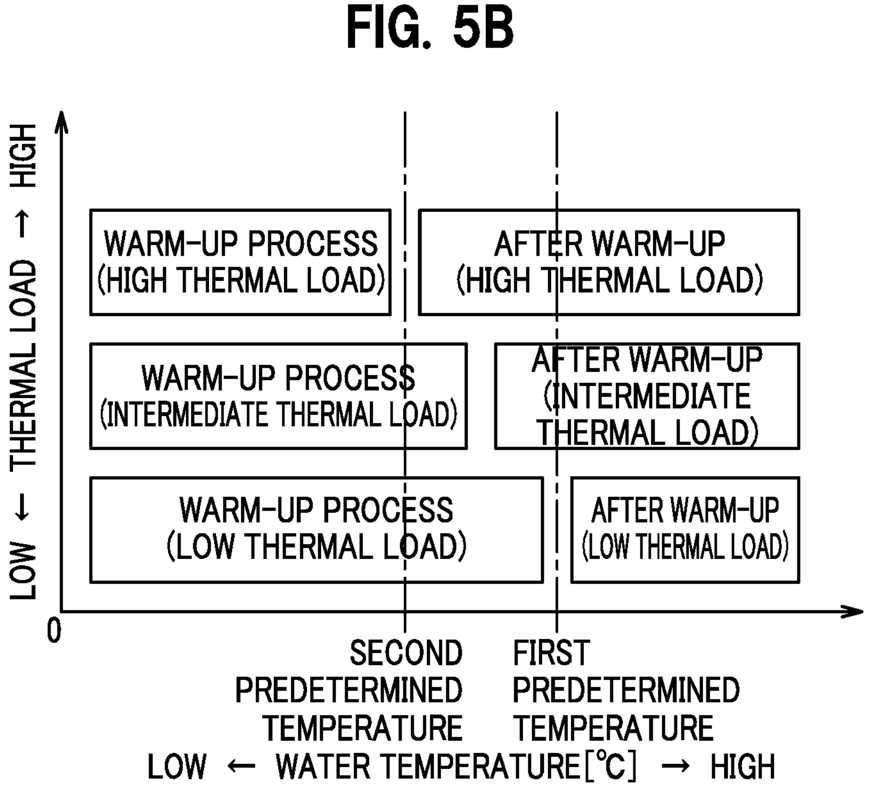
FIG. 5B shows relationships of control regions of a heater in the thermostat with the water temperature of cooling water in the engine and the thermal load of the engine.

As shown in FIG. 5B, when the water temperature of the engine 21 is low (the first predetermined temperature (for example, 105° C.) or lower) and the thermal load of the engine 21 is low (in other words, necessity of cooling the engine 21 is relatively low and the target water temperature is set high), the heater controller 54 of the control device 50 does not supply power to the heater 42.

In this case, the internal combustion engine cooling system 1 is in a state where the thermostat 22 closes the radiator circuit 13 as shown in FIG. 1A.

In this state, since the cooling water in the internal combustion engine cooling system 1 does not flow through the radiator 25 to be cooled, the engine 21 is warmed up.

<<After Warm-Up at Low Thermal Load>>

As shown in FIG. 5B, when the water temperature of the cooling water rises in the warm-up process at the low thermal load and the water temperature of the cooling water reaches the first predetermined temperature (105° C., that is the opening temperature of the thermostat 22), the internal combustion engine cooling system 1 is in a state where, as shown in FIG. 1B, the thermostat 22 opens the radiator circuit 13 without the heater controller 54 of the control device 50 supplying power to the heater 42.

In this state, since part of the cooling water in the internal combustion engine cooling system 1 flows through the radiator 25 to be cooled, the engine 21 is cooled.

<<Warm-Up Process at Intermediate Thermal Load>>

As shown in FIG. 5B, when the water temperature of the engine 21 is low (the first predetermined temperature (105° C.) or lower) and the thermal load of the engine 21 is low (in other words, necessity of cooling the engine 21 is relatively low and the target water temperature is set high), the heater controller 54 of the control device 50 does not supply power to the heater 42.

In this case, the internal combustion engine cooling system 1 is in a state where the thermostat 22 closes the radiator circuit 13 as shown in FIG. 1A.

In this state, since the cooling water in the internal combustion engine cooling system 1 does not flow through the radiator 25 to be cooled, the engine 21 is warmed up.

<<After Warm-Up at Intermediate Thermal Load: Main Heating of Thermostat 22>>

As shown in FIG. 5B, when the water temperature of the cooling water rises in the warm-up process at the intermediate thermal load and the water temperature of the cooling water reaches the target water temperature lower than the first predetermined temperature (for example, 95° C.), the heater controller 54 of the control device 50 starts to supply power to the heater 42 (main power supply). In the main power supplying duty ratio map 51*b* of FIG. 3B, the duty ratio in the main power supply is set to be higher as the difference between the target water temperature and the water temperature is larger, in other words, the smaller the difference between the target water temperature and the water temperature is, the lower the duty ratio is. The heater controller 54 performs the main power supplying to the heater 42 by referring to such a power supplying duty ratio map.

In this case, the internal combustion engine cooling system 1 is in a state where the thermostat 22 opens the radiator circuit 13 as shown in FIG. 1B.

In this state, since part of the cooling water in the internal combustion engine cooling system 1 flows through the radiator 25 to be cooled, the engine 21 is cooled.

<<Warm-Up Process at High Thermal Load: Preheating of Thermostat 22>>

As shown in FIG. 5B, when the water temperature of the engine 21 is low and the thermal load of the engine 21 is high (in other words, necessity of cooling the engine 21 is relatively high and the target water temperature is set low), the heater controller 54 of the control device 50 supplies power to the heater 42 (pre-power supplying) in the case where the difference between the target water temperature and the water temperature of the cooling water is larger than a predetermined value (−5° C.). The duty ratio in the pre-power supplying is 100% at the high thermal load as shown in the pre-power supplying duty ratio map 51*c* of FIG. 4A.

In this case, the internal combustion engine cooling system 1 is in a state where the thermostat 22 opens the radiator circuit 13 and closes the bypass circuit 12 as shown in FIG. 1B.

In this state, since part of the cooling water in the internal combustion engine cooling system 1 flows through the radiator 25 to be cooled, the engine 21 is cooled.

Here, the heater controller 54 refers to the pre-power supplying duty ratio map 51*c* based on the obtained engine rotation speed and air charge ratio to read the duty ratio corresponding to the obtained engine rotation speed and air charge ratio, and performs the duty control on the heater 42 based on the read duty ratio.

<<After Warm-Up at High Thermal Load: Main Heating of Thermostat 22>>

As shown in FIG. 5B, when the water temperature of the cooling water rises in the warm-up process at the high thermal load and the difference between the target water temperature and the detected water temperature of the cooling water is smaller than the predetermined value (−5° C.), in the internal combustion engine cooling system 1, as shown in FIG. 1B, the heater controller 54 of the control device 50 continuously supplies power to the heater 42 (main power supplying). In the power supplying duty ratio map 51*b* of FIG. 3B, the duty ratio in the main power supplying is shown in a region where the target water temperature is high and the difference between the target water temperature and the water temperature is equal to or smaller than 0° C.

In this state, since part of the cooling water in the internal combustion engine cooling system 1 flows through the radiator 25 to be cooled, the engine 21 is cooled.

Figures 6A, 6B, 6C, 6D:
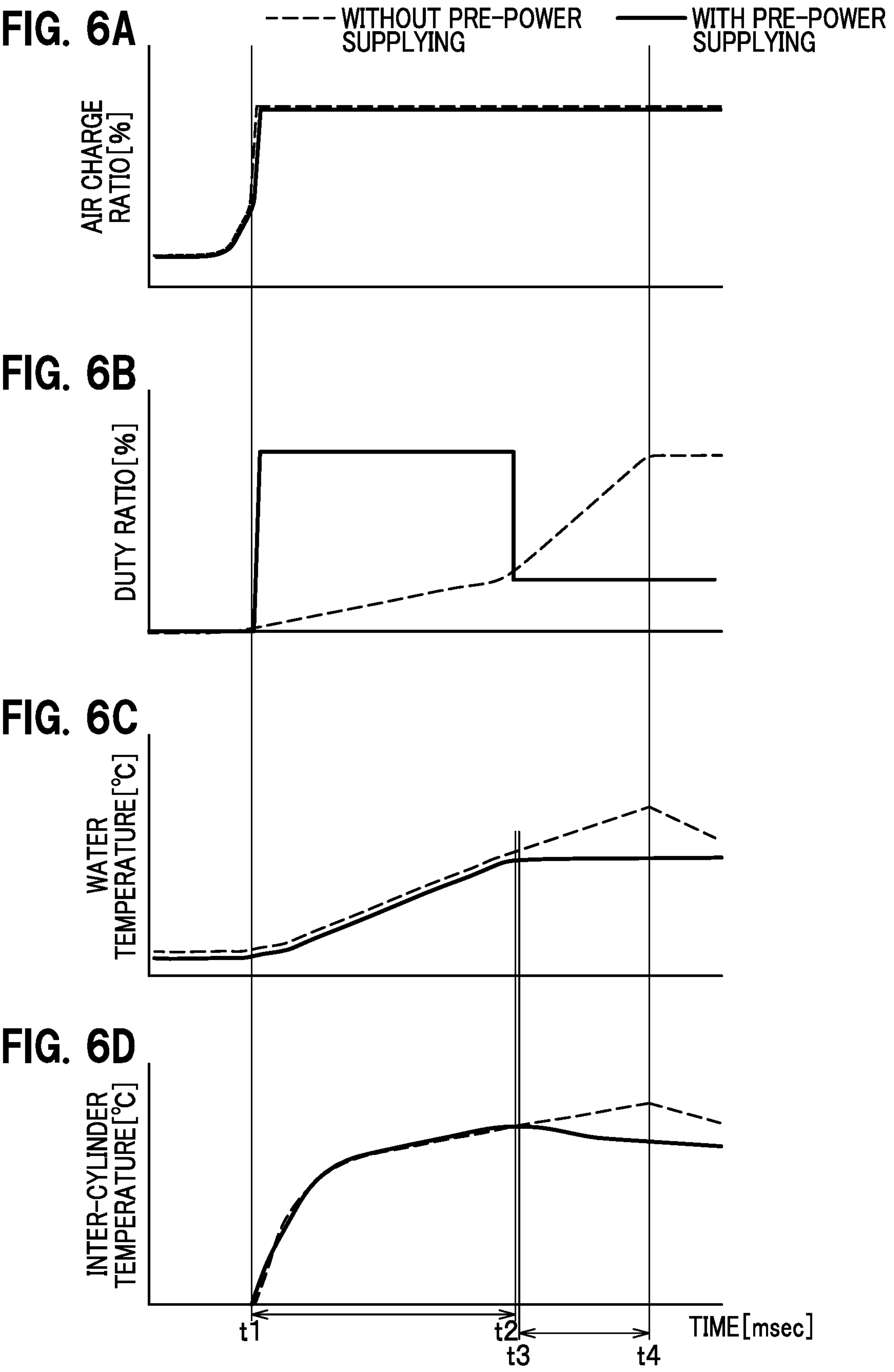
FIGS. 6A to 6D show results of comparison between the case where pre-power supplying is performed and the case where no pre-power supplying is performed.

As shown by the dotted line in FIG. 6B, in the internal combustion engine cooling system 1, when no pre-power supplying is performed in the warm-up process at the high thermal load, the heater controller 54 starts supplying power to the heater 42 at time t3 when the water temperature of the cooling water detected by the water temperature sensor 33 reaches the target water temperature (90° C.) and then causes the thermostat 22 to open at time t4. In this case, the water temperature of the cooling water at the time when the thermostat 22 opens is 120° C. which is higher than 90° C. being the target water temperature (see FIG. 6C).

Meanwhile, as shown by the solid line in FIG. 6B, in the internal combustion engine cooling system 1, when the pre-power supplying is performed in the warm-up process at the high thermal load, the heater controller 54 starts supplying power to the heater 42 at time t1 before the time t3 and then causes the thermostat 22 to open at time t2 before the time t4. In this case, the water temperature of the cooling water at the time when the thermostat 22 opens is 90° C. which is the target water temperature (see FIG. 6C).

Moreover, as shown by the solid line and the dotted line of FIG. 6D, an inter-cylinder temperature of the engine 21 in the case where the pre-power supplying is performed is lower than the inter-cylinder temperature of the engine 21 in the case where no pre-power supplying is performed.

Accordingly, the internal combustion engine cooling system 1 can guarantee a certain level of the inter-cylinder temperature of the engine 21 by performing the pre-power supplying.

<Second Operation Example>

Next, a second operation example of the internal combustion engine cooling system 1 is described while focusing on differences from the first operation example. The second operation example is an operation example in which the standby power supplying to the heater 42 is performed in the closed state of the thermostat 22.

<<Warm-Up Process at Low Thermal Load and Intermediate Thermal Load: Standby Heating of Thermostat 22>>

In this operation example, as shown in FIGS. 7A and 7B, in the warm-up process at the low thermal load and the intermediate thermal load, when the target water temperature of the cooling water is higher than the second predetermined temperature (90° C.) and the water temperature of the cooling water is lower than the target temperature at each thermal load (low thermal load: 105° C., intermediate thermal load: 95° C.), the heater controller 54 of the control device 50 performs the standby power supplying to the heater 42 within a range in which the thermostat 22 is maintained in the closed state. The standby power supplying causes the thermostat 22 to be heated such that the thermostat 22 is maintained in the closed state without opening (standby heating).

<<Warm-Up Process at High Thermal Load: Standby Heating of Thermostat 22>>

Moreover, as shown in FIG. 7C, in the warm-up process at the high thermal load, when the difference between the target water temperature of the cooling water and the water temperature detected by the water temperature sensor 33 is equal to or smaller than the predetermined value (−5° C.), the heater controller 54 of the control device 50 performs the standby power supplying to the heater 42 within the range in which the thermostat 22 is maintained in the closed state. The standby power supplying causes the thermostat 22 to be heated such that the thermostat 22 is maintained in the closed state without opening (standby heating).

Specifically, when the target water temperature of the cooling water is higher than the second predetermined temperature and is lower than the first predetermined temperature and the water temperature of the cooling water is lower than the target temperature, that is in the warm-up process at the low thermal load and the intermediate thermal load or when the target water temperature of the cooling water is the second predetermined temperature or lower and the difference between the target water temperature and the water temperature of the cooling water is equal to or smaller than the predetermined value, that is before the pre-power supplying in the warm-up process at the high thermal load, the heater controller 54 performs the standby power supplying to the heater 42 within the range in which the thermostat 22 is maintained in the closed state.

Here, the heater controller 54 refers to the standby power supplying duty ratio map 51*d* based on the obtained target water temperature and water temperature to read the duty ratio corresponding to the obtained target water temperature and water temperature, and performs the duty control on the heater 42 based on the read duty ratio.

Figure 8A:
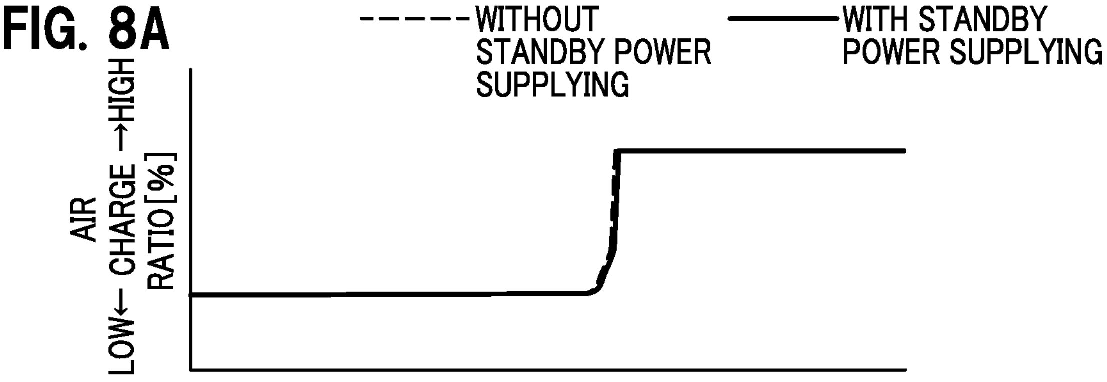
FIGS. 8A to 8D show results of comparison between the case where standby power supplying is performed and the case where no standby power supplying is performed.
Figure 8B:
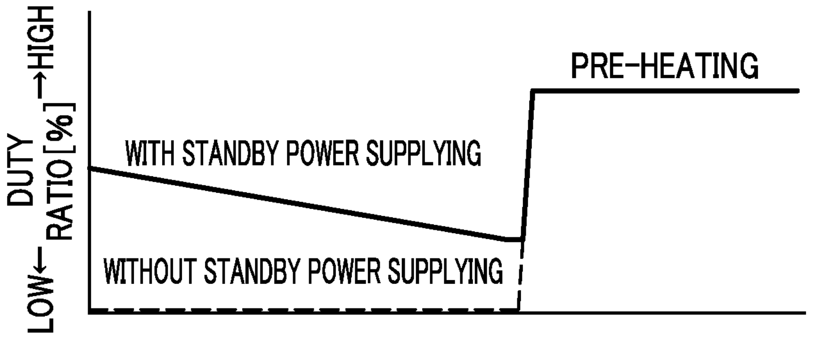
Figure 8C:
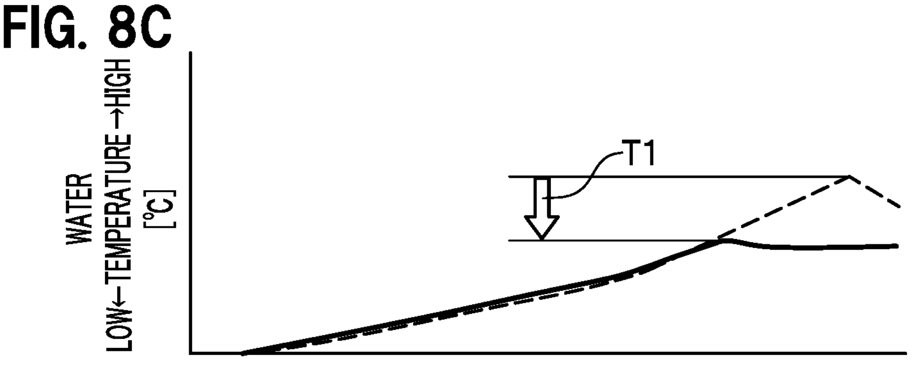
Figure 8D:
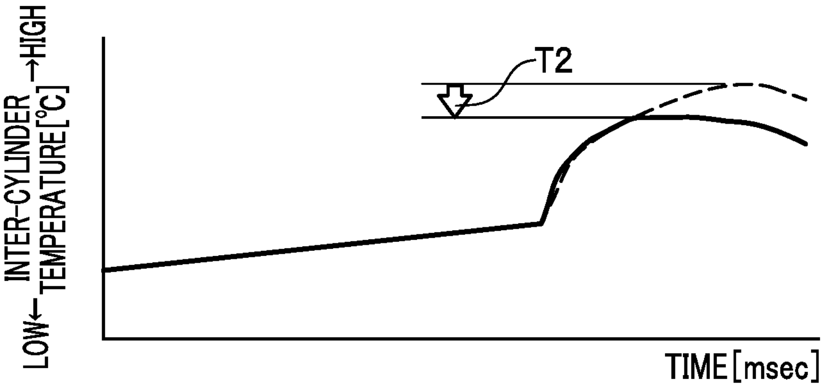

In the example shown in FIGS. 8A to 8D, in the warm-up process at the low thermal load before the rise of the rotation speed and torque of the engine 21, the standby power supplying is performed prior to the pre-power supplying and the main power supplying as shown in FIGS. 8A to 8D. As shown in FIGS. 8C and 8D, this can reduce the highest value of the water temperature detected by the water temperature sensor 33 by T1 and reduce the highest value of the inter-cylinder temperature of the engine 21 by T2 from those in the case where the pre-power supplying and the main power supplying are performed without performing the standby power supplying.

<Method of Controlling Heater Based on Target Water Temperature and Water Temperature>

Figure 9:
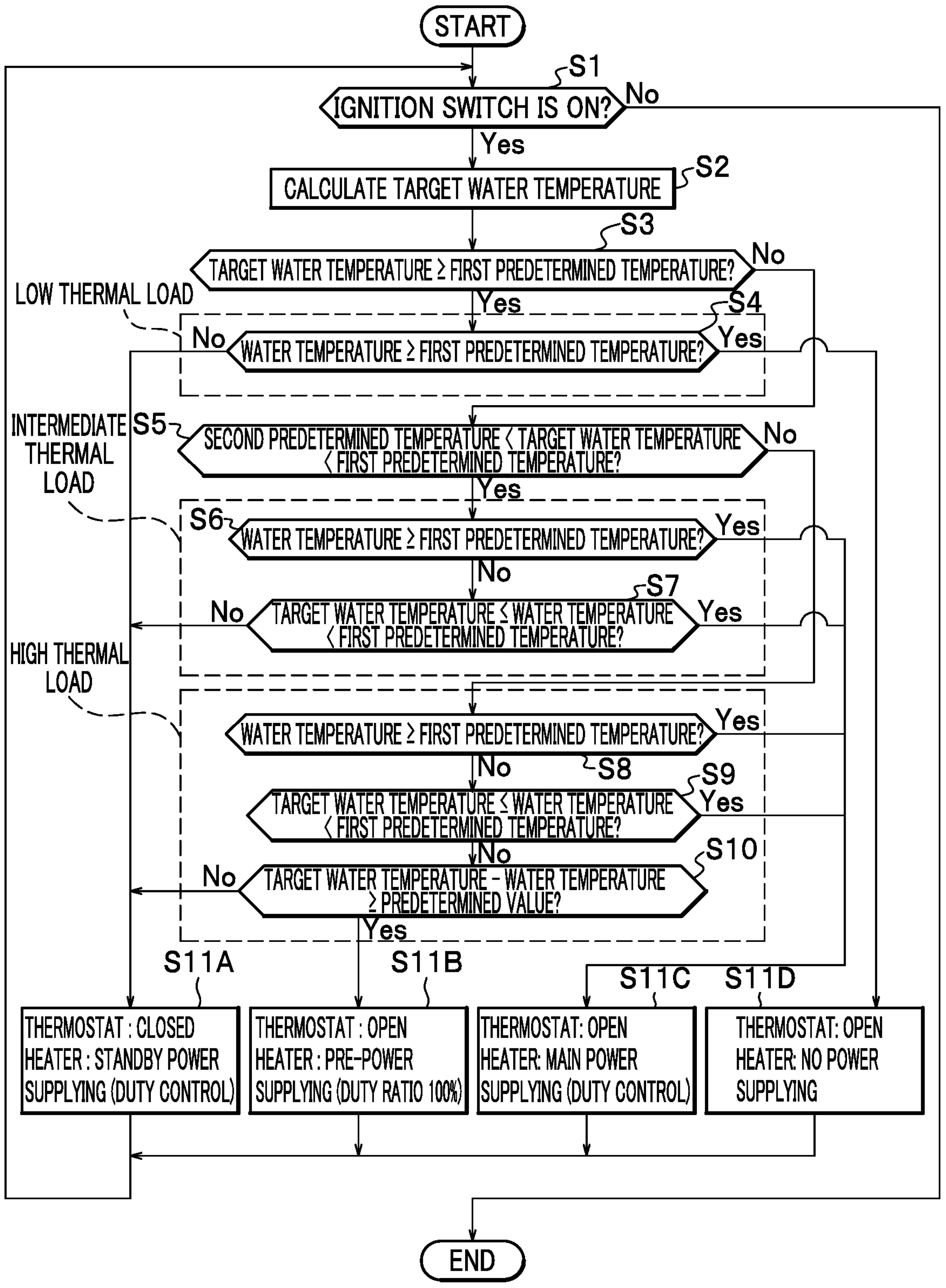
FIG. 9 is a flowchart for explaining open-closed states of the thermostat and a method of controlling the heater based on the target water temperature and the water temperature detected by the water temperature sensor.

Next, the open-closed state of the thermostat and a method of controlling the heater based on the target water temperature and the water temperature detected by the water temperature sensor are described with reference to FIG. 9. The control method described herein is a method corresponding to the second operation example in which the standby power supplying is performed.

In this control example, calculation of the target water temperature by the target water temperature calculator (step S2) and determination of the method of controlling the heater 42 by the heater controller 54 (steps S3 to S11A, S11B, S11C, and S11D) are repeatedly performed while an ignition switch is ON (YES in step S1).

Meanwhile, when the water temperature detected by the water temperature sensor 33 is equal to or higher than the target water temperature (No in step S8 and Yes in step S9), the heater controller 54 performs the main power supplying to the heater 42 and the thermostat 22 is in the open state (step S11C).

The aforementioned relationships can be summarized as follows.

TABLE 1

| | | | | |
|---|---|---|---|---|
| target temperature ≥ first predetermined temperature | water temperature | lower than first predetermined temperature | | first predetermined temperature or higher |
| | thermostat | closed | | open |
| | heater | standby power supplying | | no power supplying |
| second predetermined temperature < target water temperature < first predetermined temperature | water temperature | lower than target water temperature | target water temperature or higher and lower than first predetermined temperature | first predetermined temperature or higher |
| | thermostat | closed | open | open |
| | heater | standby power supplying | main power supplying | main power supplying |
| target water temperature ≤ second predetermined temperature | water temperature | "target water temperature - predetermined value" or higher | target water temperature or higher and lower than first predetermined temperature | first predetermined temperature or higher |
| | thermostat | open | open | open |
| | heater | pre-power supplying | main power supplying | main power supplying |

<<Case of Low Thermal Load>>

When the target water temperature calculated in step S2 is the first predetermined temperature (105° C.) or higher (in the embodiment, the target water temperature is equal to the first predetermined temperature) (Yes in step S3), the following operation is performed. When the water temperature detected by the water temperature sensor 33 is lower than the first predetermined temperature (No in step S4), the heater controller 54 performs the standby power supplying to the heater 42 and the thermostat 22 is in the closed state (step S11A).

Meanwhile, when the water temperature detected by the water temperature sensor 33 is the first predetermined temperature or higher (Yes in Step S4), the heater controller 54 does not supply power to the heater 42 and the thermostat 22 is in the open state due to the water temperature (step S11D).

<<Case of Intermediate Thermal Load>>

When the target water temperature calculated in step S2 is higher than the second predetermined temperature (90° C.) and lower than the first predetermined temperature (105° C.) (No in step S3 and YES in step S5), the following operation is performed. When the water temperature is detected by the water temperature sensor 33 is lower than the target water temperature (No in step S6 and No in step S7), the heater controller 54 performs the standby power supplying to the heater 42 and the thermostat 22 is in the closed state (step S11A).

Meanwhile, when the water temperature detected by the water temperature sensor 33 is the target water temperature or higher (Yes in step S7), the heater controller 54 performs the main power supplying to the heater 42 and the thermostat 22 is in the open state (step S11C). In step S11C, the heater controller 54 performs the main power supplying to the heater 42 also when the detected water temperature is higher than the first predetermined temperature to maintain the detected water temperature constantly at the target water temperature.

<<Case of High Thermal Load>>

When the water temperature detected by the water temperature sensor 33 is "target water temperature—predetermined value" or higher (No in step S8, No in step S9, and Yes in step S10), the heater controller 54 performs the pre-power supplying to the heater 42 and the thermostat 22 is in the open state (step S11B).

The internal combustion engine cooling system 1 according to the embodiment of the present invention determines the timing of stating the power supplying to the heater 42 based on the rotation speed and the engine load (air charge ratio) of the engine 21 and the water temperature of the cooling water flowing through the thermostat 22. Accordingly, it is possible to preferably heat the thermostat 22 with the heater 42 and prevent abnormal water temperature rise of the cooling water before the opening of the thermostat 22.

Moreover, when the rotation speed and the engine load (air charge ratio) of the engine 21 fall under the high thermal load condition and the difference between the target water temperature and the water temperature of the cooling water is larger than the predetermined value, the internal combustion engine cooling system 1 starts supplying power to the heater 42. Accordingly, when the engine 21 is in the high thermal load state, it is possible to preferably heat the thermostat 22 with the heater 42 and prevent the abnormal water temperature rise of the cooling water before the opening of the thermostat 22.

Furthermore, the internal combustion engine cooling system 1 performs duty control on the heater 42 such that the larger the difference between the target water temperature and the water temperature of the cooling water is, the higher the duty ratio in the power supplying is. Accordingly, when the water temperature of the cooling water exceeds the target temperature, it is possible to increase the duty ratio of the heater 42 and increase the flow rate of the cooling water to the radiator 25.

Moreover, prior to the power supplying (pre-power supplying and main power supplying) to the heater 42, the internal combustion engine cooling system 1 performs the standby power supplying to the heater 42 within the range in which the thermostat 22 is maintained in the closed state. Accordingly it is possible to preheat the thermostat 22 and improve opening response.

Furthermore, combining the pre-power supplying and the standby power supplying can decrease the predetermined value (target water temperature–water temperature) which is a threshold for the pre-power supplying (that is bring the predetermined value closer to zero).

Moreover, the internal combustion engine cooling system 1 performs the duty control on the heater 42 such that the higher the water temperature of the cooling water is, the lower the duty ratio in the standby power supplying is. Accordingly, the heater 42 can be preferably preheated within the range in which the thermostat 22 is maintained in the closed state.

The embodiment of the present invention has been described above but the present invention is not limited to the aforementioned embodiment and appropriate changes can be made within a scope not departing from the spirit of the present invention.

For example, the method of measuring (calculating) the air charge ratio as the engine load is not limited to that described above. For example, the engine load measurement unit 52 may measure (calculate) the air charge ratio based on the rotation speed and a throttle opening degree or a boost (intake negative pressure) of the engine 21.

Moreover, the engine load measurement unit 52 may be configured to measure (calculate) an engine load other than the air charge ratio.

Specifically, the engine load measurement unit 52 only has to be configured to obtain the engine load calculation parameter detected by the engine load calculation parameter detector and measure (calculate) the engine load of the engine 21 based on the obtained engine load calculation parameter.

Moreover, the predetermined value which is the threshold for the pre-power supplying may be set to vary depending on the target water temperature.

REFERENCE SIGNS LIST

1: internal combustion engine cooling system
11: cooling circuit
13: radiator circuit
21: engine (internal combustion engine)
22: thermostat
25: radiator
42: heater
50: control device

The invention claimed is:

1. An internal combustion engine cooling system, comprising:

an internal combustion engine;

a cooling circuit in which cooling fluid for cooling the internal combustion engine is circulated;

a radiator for cooling the cooling fluid;

a radiator circuit which branches from the cooling circuit to guide the cooling fluid to the radiator and return the cooling fluid having passed the radiator to the cooling circuit;

a thermostat which is provided in a portion where the cooling circuit and the radiator circuit are connected to each other and which opens and closes a path between the cooling circuit and the radiator circuit;

a heater for heating the thermostat; and a control device for controlling the heater, wherein the thermostat is in a closed state for blocking the path between the cooling circuit and the radiator circuit below a first predetermined temperature of the cooling fluid, the first predetermined temperature being set as a highest value of a target temperature of the cooling fluid, and the thermostat is in an open state for opening the path between the cooling circuit and the radiator circuit at or above the first predetermined temperature, and the control device:

includes a target temperature map in which rotation speed and engine load of the internal combustion engine are associated with the target temperature of the cooling fluid flowing through the thermostat, starts supplying power to the heater to set the thermostat to the open state when the target temperature associated with the rotation speed and the engine load is at or lower than a second predetermined temperature which is lower than the first predetermined temperature, a temperature of the cooling fluid flowing through the thermostat is lower than the target temperature, and an absolute value of a difference between the target temperature and the temperature of the cooling fluid is smaller than an absolute value of a predetermined value, and performs standby power supplying to the heater within a range in which the thermostat is maintained in the closed state when the target temperature of the cooling fluid is higher than the second predetermined temperature and is lower than the first predetermined temperature and the temperature of the cooling fluid is lower than the target temperature or when the target temperature of the cooling fluid is at or lower than the second predetermined temperature, the temperature of the cooling fluid is lower than the target temperature, and the absolute value of the difference between the target temperature and the temperature of the cooling fluid is equal to or larger than the absolute value of the predetermined value.

2. The internal combustion engine cooling system according to claim 1, wherein the control device performs duty control on the heater such that the higher the temperature of the cooling fluid is, the lower a duty ratio in the standby power supplying is, or the larger the absolute value of the difference between the target temperature and the temperature of the cooling fluid is, the lower the duty ratio in the standby power supplying is.

3. An internal combustion engine cooling system, comprising:

an internal combustion engine;

a cooling circuit in which cooling fluid for cooling the internal combustion engine is circulated;

a radiator for cooling the cooling fluid;

a radiator circuit which branches from the cooling circuit to guide the cooling fluid to the radiator and return the cooling fluid having passed the radiator to the cooling circuit;

a thermostat which is provided in a portion where the cooling circuit and the radiator circuit are connected to each other and which opens and closes a path between the cooling circuit and the radiator circuit;

a heater for heating the thermostat; and a control device for controlling the heater, wherein the thermostat is in a closed state for blocking the path between the cooling circuit and the radiator circuit below a first predetermined temperature of the cooling fluid and is in an open state for opening the path between the cooling circuit and the radiator circuit at or above the first predetermined temperature, and when a target temperature of the cooling fluid flowing through the thermostat is higher than a second predetermined temperature which is lower than the first predetermined temperature and is lower than the first predetermined temperature and a temperature of the cooling fluid flowing through the thermostat is lower than the target temperature or when the target temperature of the cooling fluid is at or lower than the second predetermined temperature, the temperature of the cooling fluid is lower than the target temperature, and an absolute value of a difference between the target temperature and the temperature of the cooling fluid is equal to or larger than an absolute value of a predetermined value, the control device performs standby power supplying to the heater within a range in which the thermostat is maintained in the closed state.

* * * * *